UNITED STATES PATENT OFFICE.

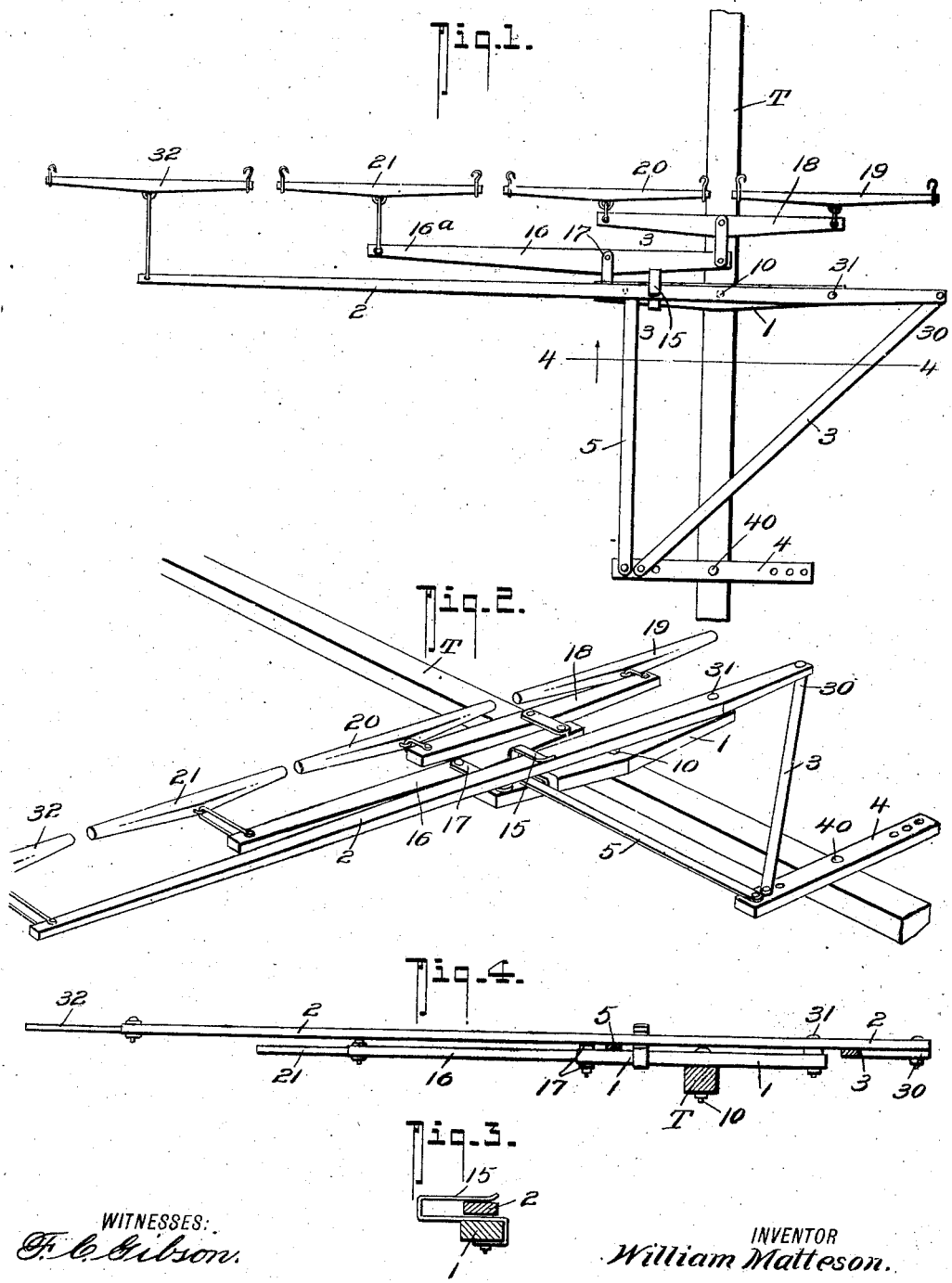

WILLIAM MATTESON, OF DOLAND, SOUTH DAKOTA.

DRAFT-EQUALIZER.

No. 850,535.　　　Specification of Letters Patent.　　　Patented April 16, 1907.

Application filed April 14, 1906. Serial No. 311,647.

*To all whom it may concern:*

Be it known that I, WILLIAM MATTESON, residing at Doland, in the county of Spink and State of South Dakota, have invented certain new and useful Improvements in Draft-Equalizers, of which the following is a specification.

This invention, which relates generally to improvements in draft-equalizers, more specifically has for its purpose to provide an improved side-draft equalizer or evener of a simple and economical construction which can be readily utilized for use on such farm implements or machines for which eveners or equalizers are generally employed and which will effectively serve for its intended purposes.

Generally my invention comprehends an improved arrangement of parts whereby to provide for a straight and direct pull for three or more horses, with all of the horses working on the left-hand side, except the off horse, that is hitched on the right side of the tongue or draft-bar and in such manner whereby the three or more horses at one side will follow the off horse wherever it may go, the same as if only two horses were hitched to the machine.

My invention also provides draft members having such coöperative relations and combinations whereby to avoid the necessity of the end horse or horses next the uncut grain or last furrow from walking therein and yet provide for the direct or even draft of the plow-harvester or other farm implement or machine.

With the above objects in view and other objects hereinafter explained my invention consists in certain details of construction and peculiar combination of parts hereinafter described and claimed, reference being had to the accompanying drawings, in which—

Figure 1 is a plan view of my invention with so much of the draft-tongue of a binding-machine as is necessary to illustrate the practical application of the same. Fig. 2 is a perspective view of the parts shown in Fig. 1. Fig. 3 is a cross-section thereof on the line 3 3 of Fig. 1. Fig. 4 is a cross-section on the line 4 4 of Fig. 1.

In the simplest arrangement of my invention the same is mounted upon a draft-tongue or other part of the machine to be pulled, in the drawings a binding-machine tongue being shown, and the said invention comprises a pair of parallelly-disposed cross-bars, a front and a rear one, (designated, respectively, 1 and 4,) which are pivotally held midway their length on the top of the tongue T by bolts 10 and 40, and at one side (left-hand side) of the tongue T the members 1 and 4 are connected by a side draft or push equalizer-bar 5, which extends parallel with the bar T and has its end adjustably connected with the corresponding ends of the bars 1 and 4 by means of bolts, as clearly shown in Fig. 1 of the drawings.

3 designates what I term the "push-bar" or "side-draft distributer," which is disposed diaognally with respect to the draft-beam and has its inner end adjustably connected to the pull member 4 at one side—the left of the tongue T—and has its outer end projected diagonally forward and terminating approximately in line with the front cross-bar 1, and the said front end 30 forms a fulcrum-bearing for a long pulling-lever 2, which latter is also pivotally connected, as at 31, to the right-hand end of the cross or front pull-bar 1.

The lever 2 extends across the tongue T and has its outer end provided with a singletree 32 to accommodate the outer and rearmost one of the horses used on the left side of the tongue.

The pull-bar 1 near its left-hand end has an S-shaped guide and stop member 15, disposed transversely with respect to the said bar 1, and in the lower end of the said guide the front end of the long pull-lever 2 plays, and whose outward swing is limited by engaging the stop end of the member 15, as will be clearly understood from Fig. 3 of the drawings.

16 designates the tripletree, which is adjustably connected by a clevis 17 to the inner (left hand) end of the main equalizer or pull bar 1, which latter carries at the outer end 16ᵃ (which end is in alinement with the tongue T) a doubletree 18, provided with the singletrees 19 and 20, the latter being adapted for attaching the off horse on the right side of the tongue T. The inner end of the tripletree 16 carries a singletree 21.

From the foregoing, taken in connection with the accompanying drawings, the detailed construction and the coöperation of the several parts, together with their advantages, will be readily apparent.

It will be noticed that by reason of the peculiar construction of the parts, as shown and described, the several evener or equalizer bars have such connection with each other and with the draft-beam that the off horse or horses can be driven over the unplowed ground, as the entire draft is distributed to give the direct central pull to the tongue T with practically no side draft, since the latter is distributed through the medium of the diagonally-disposed member 2 and the connections therewith to the main draft-bar 1, and, furthermore, by reason of the S-shaped loop and the manner in which the long lever 2 is connected in case an excessive pull or draft is on the long lever 2 the said draft would also be transmitted to the equalizer-bar 1 at that end where the tripletree 16 connects therewith by reason of the bar 2 engaging the stop-guide 15 on the bar 1, thus distributing the heavy as well as the light draft on the plow side of the machine evenly and making the pull on the machine direct.

What I claim is—

1. The combination with a tongue T, the front cross-bar 1 and the rear cross-bar 4 pivotally mounted on the said tongue; of an equalizer-bar 5 pivotally secured at its opposite ends to the said front and rear cross-bars, a diagonally-disposed side-draft bar 3 secured at one end to the rear cross-bar at a point adjacent the bar 5, the pull-lever 2 pivotally connected to the front end of the diagonally-disposed draft-bar 3 and pivotally mounted on the end of bar 1 adjacent the said bar 3, a singletree 32 connected to the front end of the lever 2, a doubletree 16 pivotally connected to the front cross-bar 1 adjacent the pivotal connection of the bar 5 therewith, and the singletree 21 and doubletree 18 connected with the doubletree 16, all being arranged substantially as shown and described.

2. The combination with a draft-tongue, the front and rear cross-bars, the longitudinally-extended draft-bar 5 and diagonally-extended draft-bar 3, said bars being both connected with one, the inner, end of the cross-bar 4, one of the said bars 5 being connected with the corresponding end of the cross-bar 1, the pull-lever 2 pivotally mounted on the outer end of the cross-bar and pivotally connected with the outer end of the diagonal bar 3, the U-shaped stop member 15 mounted on the draft-bar 1 and having rearwardly-extending fingers adapted to project over the lever 2, the front of said member 15 being closed to form an abutment for the lever 2 and single and double trees connected to the lever 2, substantially as shown and described.

3. As an improvement in equalizers, the combination with the tongue T, the front and rear cross-bars 1 and 4, the equalizer-bar 5 connected to the adjacent ends of the cross-bars 4 and 1, the diagonally-extended draft-bar 3, adjustably and pivotally connected with the inner end of the cross-rod 4, the lever 2 pivotally connected to the outer end of the cross-bar 1 and the outer end of the bar 3, the doubletree 16 pivotally connected to the front cross-bar 1 at a point adjacent the connection of the bar 3 therewith and the singletree 32 connected to the outer end of the lever 2, as set forth.

4. A draft-equalizer as described, the combination with the tongue T, the front and rear cross-bars 4, the longitudinal brace-bar 5 and the diagonally-disposed equalizer-bar 3, the lever 2 pivotally connected to the outer end of the cross-bar 1 and the outer end of the member 3, a loop projected forwardly from the draft member 1 having a turn-back that slips over the lever 2, and forms a stop for engaging its front edge, a clip member 17 secured to the extreme outer edge of the member 1 and having eyes or brackets to receive the single or double tree, substantially as shown.

5. A draft-equalizer, in combination with a draft-tongue, the front and rear cross-bars pivotally mounted thereon, a connection joining the two bars, a draft-distributing bar disposed diagonally with respect to the draft-tongue, and having its outer or front end projected substantially in alinement with the adjacent end of the front cross-bar, a long pull-lever pivotally connected at its outer end to the outer end of the diagonal bar and to the front cross-bar adjacent its connection to the diagonal bar and a loop stop member mounted on the inner end of the front cross-bar and adapted to project over and limit the forward pull of the lever 2, for the purposes specified.

WILLIAM MATTESON.

Witnesses:
A. F. SENECHAL,
L. B. GREENE.